(No Model.) 7 Sheets—Sheet 1.
E. G. SHORTT.
AIR BRAKE GRADUATING MECHANISM.

No. 538,551. Patented Apr. 30, 1895.

Witnesses
Raphaël Netter
Robt. F. Gaylord

Inventor,
Edward G. Shortt,
by Duncan & Repp
Attorneys.

(No Model.) 7 Sheets—Sheet 2.

E. G. SHORTT.
AIR BRAKE GRADUATING MECHANISM.

No. 538,551. Patented Apr. 30, 1895.

RUNNING POSITION.

Witnesses:
Raphaël Netter
Robt. F. Gaylord

Inventor:
Edward G. Shortt,
by Duncan & Page
Attorneys.

(No Model.)

7 Sheets—Sheet 3.

E. G. SHORTT.
AIR BRAKE GRADUATING MECHANISM.

No. 538,551. Patented Apr. 30, 1895.

RUNNING POSITION.

Witnesses:
Raphael Netter
Robt. F. Gaylord

Inventor:
Edward G Shortt,
by Duncan & Page
Attorneys (No Model.) 7 Sheets—Sheet 4.

E. G. SHORTT.
AIR BRAKE GRADUATING MECHANISM.

No. 538,551. Patented Apr. 30, 1895.

GRADUATION POSITION.

Witnesses:
Raphaël Netter
Robt. F. Gaylord

Inventor:
Edward G Shortt,
by Duncan & Page
Attorneys (No Model.)  7 Sheets—Sheet 5.
E. G. SHORTT.
AIR BRAKE GRADUATING MECHANISM.
No. 538,551.  Patented Apr. 30, 1895.
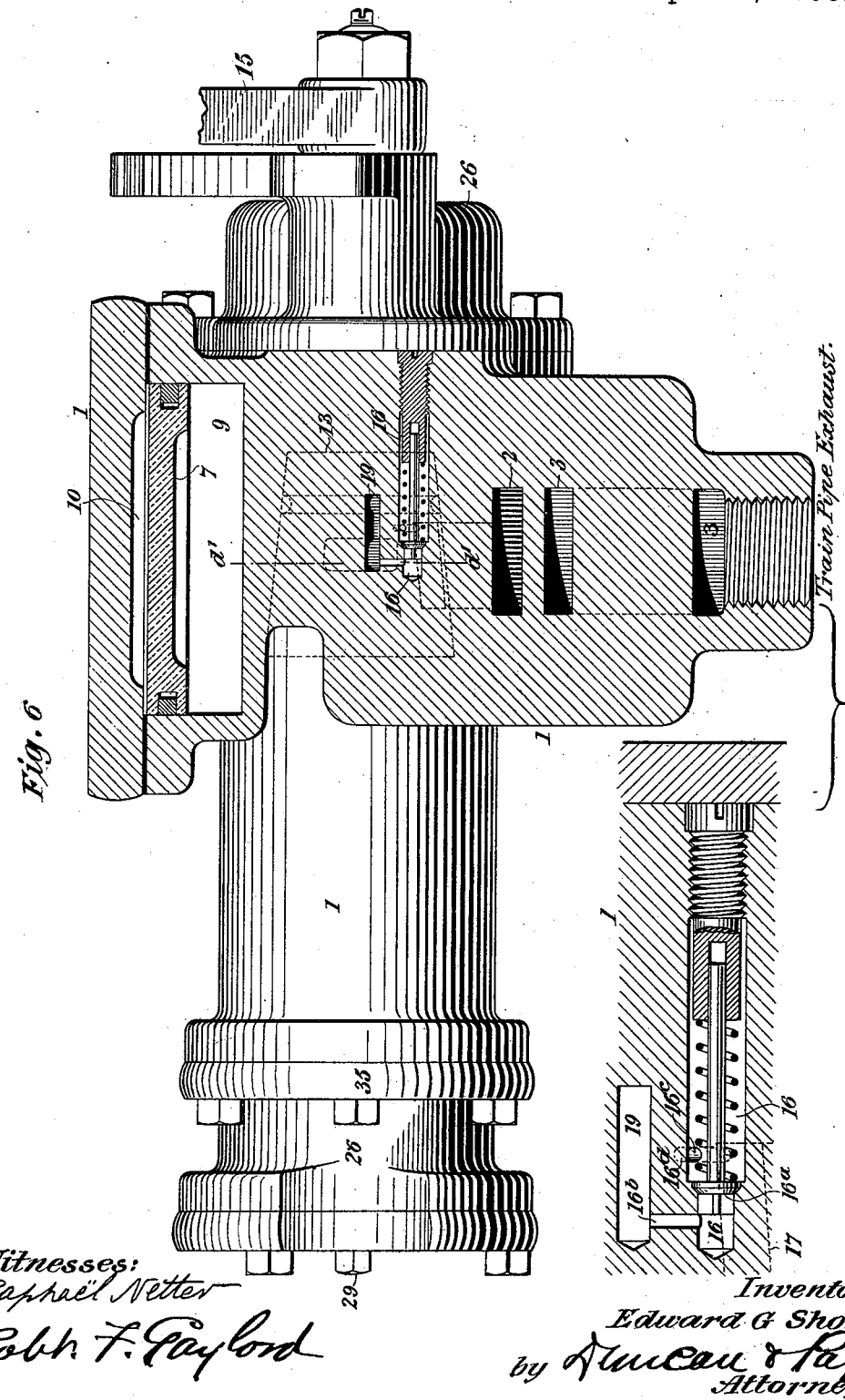
Witnesses:
Raphaël Netter
Robt. F. Gaylord
Inventor:
Edward G. Shortt
by Duncan & Page
Attorneys (No Model.) 7 Sheets—Sheet 6.
E. G. SHORTT.
AIR BRAKE GRADUATING MECHANISM.
No. 538,551. Patented Apr. 30, 1895.
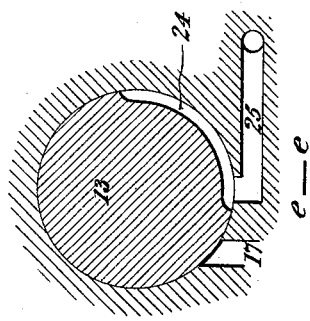
Fig. 9
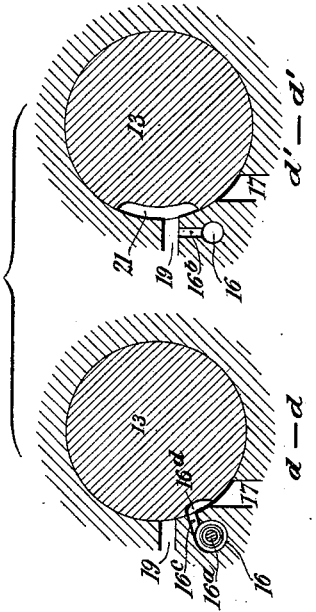
Fig. 8
Fig. 7
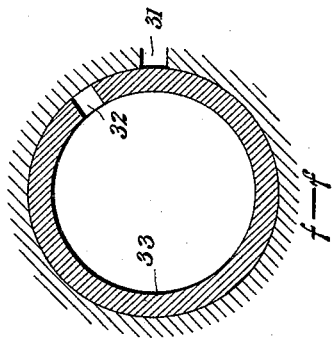
Fig. 10
Witnesses:
Raphaël Netter
Robt. F. Gaylord
Inventor:
Edward G. Shortt
by Duncan & Page
Attorneys

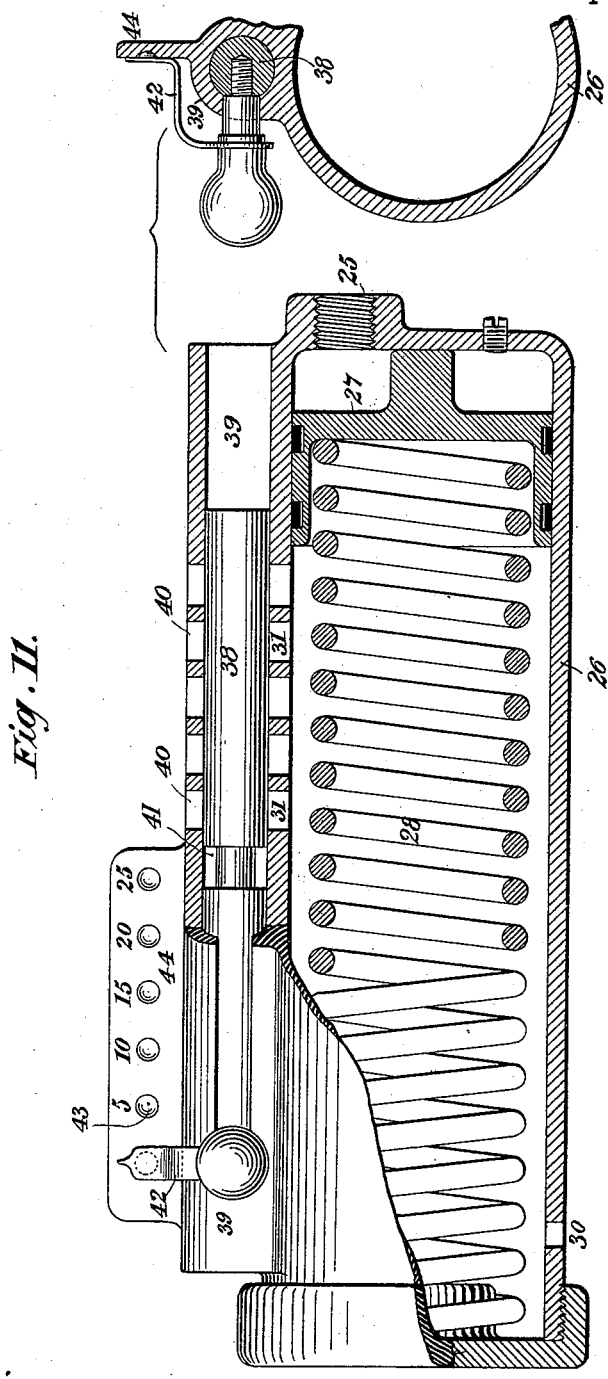

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

AIR-BRAKE GRADUATING MECHANISM.

SPECIFICATION forming part of Letters Patent No. 538,551, dated April 30, 1895.

Application filed January 7, 1895. Serial No. 534,099. (No model.)

*To all whom it may concern:*

Be it known that I, EDWARD G. SHORTT, of Carthage, in the county of Jefferson and State of New York, have invented certain new and useful Improvements in Air-Brake Graduating Mechanism, of which the following is a description, reference being had to the accompanying drawings.

This invention relates to mechanism acting automatically to produce certain predetermined amounts of train-pipe exhaust, or reduction of train pipe pressure, especially of the kind known as graduation exhaust or reductions; and it relates particularly to that class of such mechanism designed to be first adjusted or set and thereupon or thereafter to act automatically to produce a certain, defined, or measured train pipe reduction of pressure corresponding to the adjustment or setting thereof.

Figure 1:
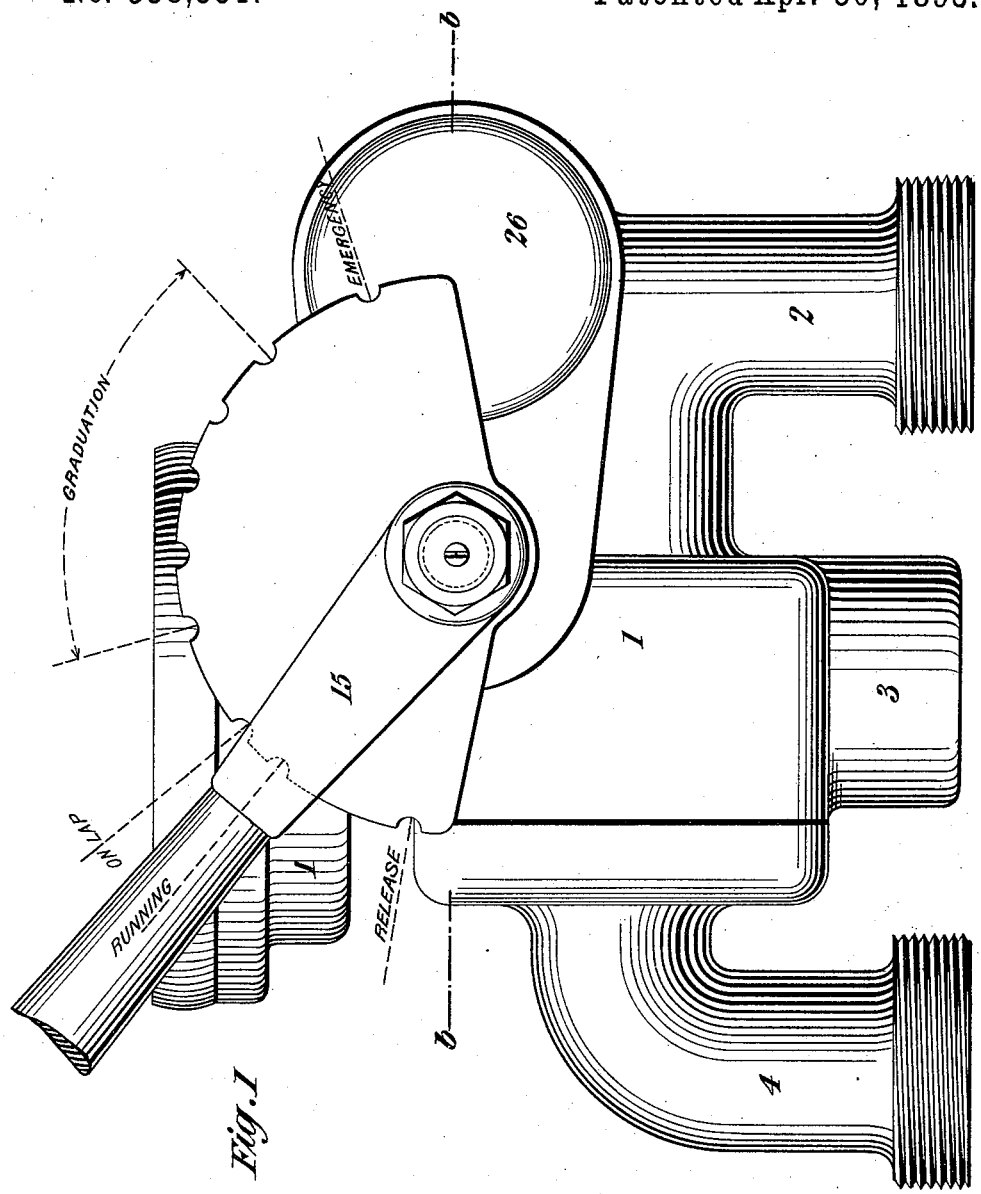
Figure 2:
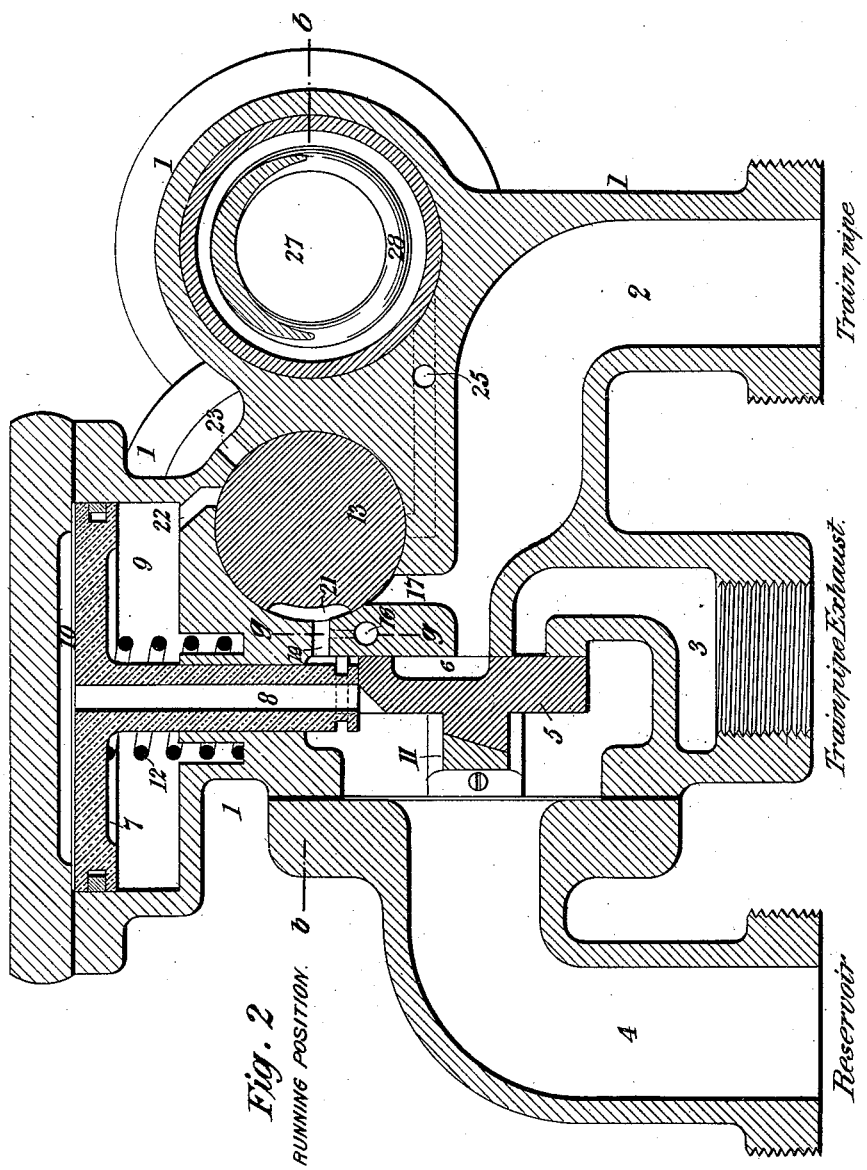
Figure 3:
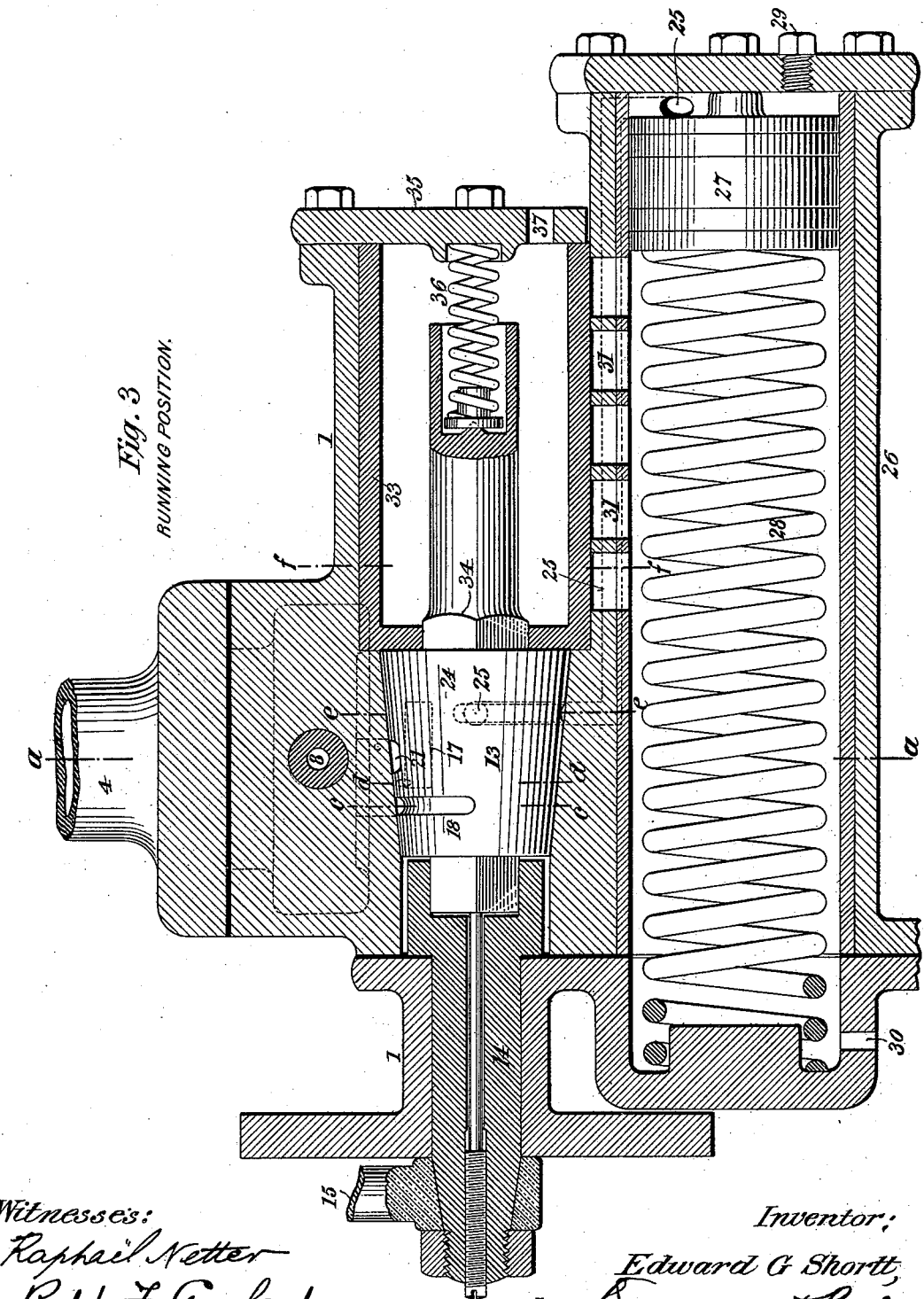
Figure 5:
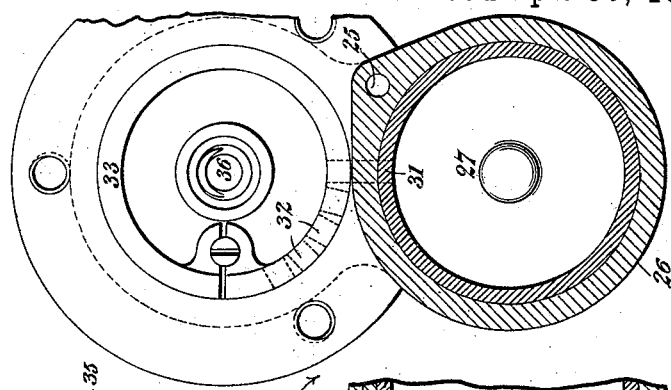
Figure 4:
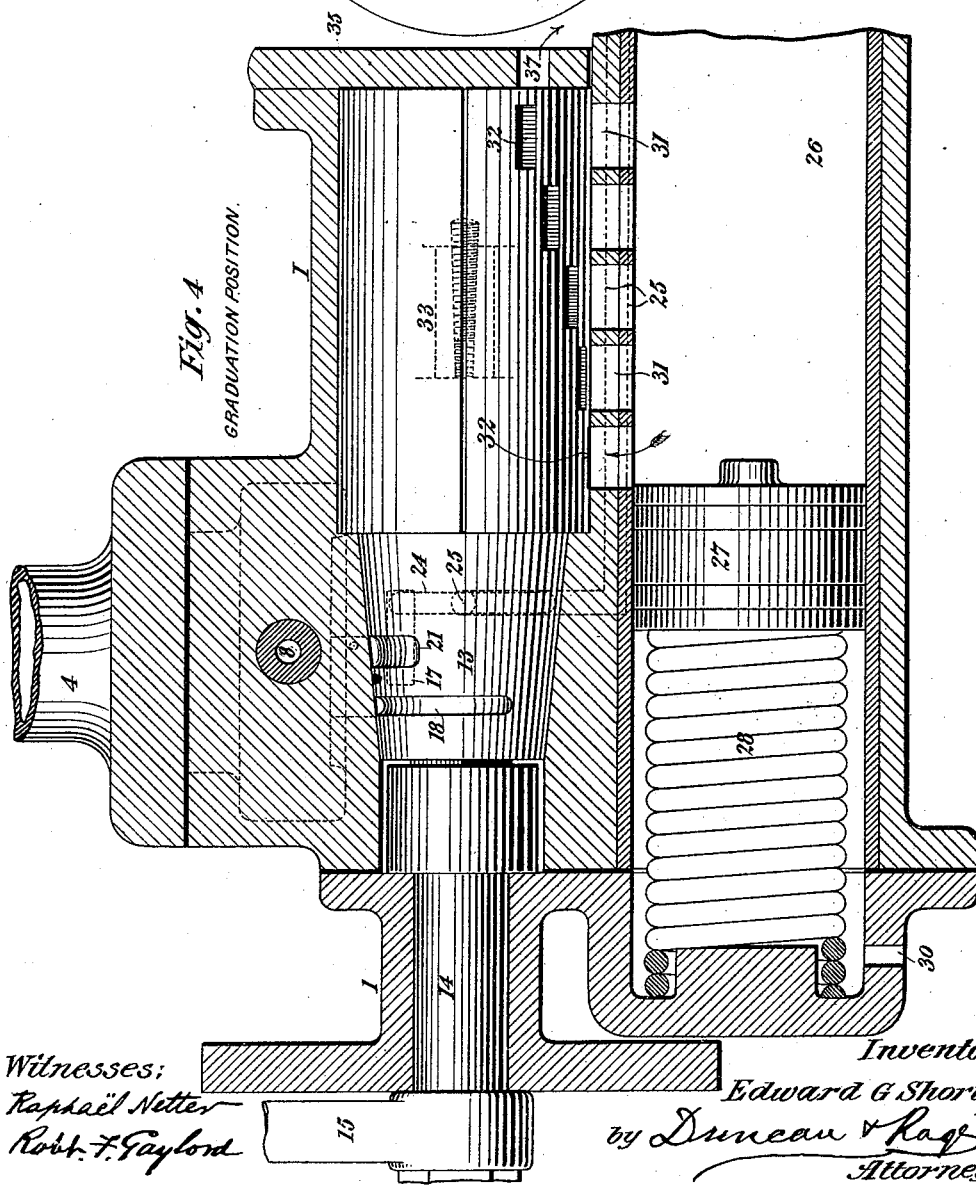

In the drawings, Figure 1 is a front elevation view of an engineer's valve mechanism embodying my invention. Fig. 2 is a central vertical section of the same on plane *a a* of Fig. 3, the parts being in running position. Fig. 3 is a horizontal section of the same on plane *b b* of Figs. 1 and 2, looking downwardly, the parts being in running position and the main or conical plug-valve being shown in full, while the drum or graduating valve is in central section on said plane. Fig. 4 is a like sectional view, the parts being in first graduation position and the main and graduation valves being shown in full. Fig. 5 is an end view of Fig. 4 from the right hand, the cover-plate of the graduation-valve barrel being removed. Fig. 6 is a vertical section on plane *g g* of Fig. 2, the plane being extended vertically through the casing of the main valve and the section being viewed from the left of said figure, this figure also showing an enlarged detail section of the feed-valve and its casing on the said plane. Fig. 7 is a cross-section of the main valve on plane *c c* of Fig. 3, viewed from the left hand of said figure. Fig. 8 shows a similar cross-section on the plane *d d* of Fig. 3 and on the plane *d' d'* of Fig. 6. Fig. 9 is a similar cross-section on the plane *e e* of said Fig. 3. Fig. 10 is a similar cross-section on the plane *f f* of Fig. 3. Fig. 11 is a modified form of construction in vertical central and cross sections.

In the views, 1 represents the main casing of the mechanism; 2, the train pipe connection; 3, the train pipe exhaust pipe, or port; 4, the main reservoir connection; 5, the emergency valve, for opening the train pipe through passage 6 in this valve to full or emergency exhaust; 7, a piston attached to and for operating said valve, and having the stem 8 open from reservoir space to above the piston, which piston is operable by fluctuation of pressures in chambers 9 and 10 below and above said piston; 11, a fixed, bevel bridge-piece for holding said valve seated, and 12, a spring for normally holding the valve in the elevated or closed position shown.

13 is the main or hand-operated valve, which is of conical form, being seated in a correspondingly shaped bearing in the main casing, and which is operatively connected through spindle 14 to the engineer's handle 15.

In the casing (Figs. 2, 6 and 8) is located the feed passage 16, which passage contains a valve 16ª of common form and spring seated for retaining reservoir pressure. This passage is in open communication through port 16ᵇ on one side of the valve with the main reservoir passage 19, and on the other side of this valve this passage communicates, when the main valve is in running position, with the train-pipe port 17, through port 16ᶜ and the feed passage 16ᵈ in the main valve.

The main valve is provided with the peripheral passage 18 (Fig. 7), adapted in extent to, in all positions except that of emergency, hold the main reservoir port 19 in open communication with the port 20 opening to the lower piston chamber 9 (Figs. 2 and 7). The peripheral emergency passage 21 is also provided (Fig. 2), by which upon suitable movement of the valve the exhaust passage 22 from chamber 9 is put to communication with the emergency port 23 opening to the atmosphere, and whereby air pressure is quickly exhausted from the chamber 9 and the valve piston caused to move the emergency valve, to fully and quickly exhaust the train pipe, by the action of air pressure in the chamber 10 which is in open communication with the main reservoir through the hollow stem of the piston. This emergency passage is also of extent adapting it, upon suitable movement of the valve, to put the reservoir port and the train pipe port to open communication for the purpose of release, passage 18 during such movement maintaining reservoir pressure in chamber 9 and holding the emergency valve closed.

24 is the graduation passage in the main valve (Fig. 8), this passage being in plane with the exhaust passage 25 extending to the right-hand end of cylinder 26, containing the graduation abutment or piston 27 held normally to position at this end of the cylinder by the graduation spring 28, which preferably is of considerable length and size so as to have a regular, uniform and certain tensional action. The cylinder is closed air-tight at its piston end, and said piston moves practically air-tight therein. A plug screw 29 however is provided whereby this end of the cylinder can be opened, thus putting the exhaust passage 25 to the atmosphere; also the spring end of the cylinder is normally opened to the atmosphere by port 30 at the other end thereof. The walls of this cylinder are pierced by graduation ports 31, which may be of equal size and be separated by spaces, of extent corresponding to the compression of the spring under certain varying pressures; and these ports are in planes with corresponding spirally arranged exhaust ports 32 piercing the shell of the drum or graduation valve 33. This drum is driven with the main valve by the angular hub 34 on the latter, a cap plate 35 fixed to the main casing serving to hold the main valve properly seated under the pressure of the spring 36, the said exhaust ports 32 and the inner space of the drum being open to atmosphere through opening 37. The disposition of the exhaust ports in this valve is such that, upon proper revolution of the latter, any one but not more than one at a time of the ports can be put to communication with the atmosphere.

Figs. 1 and 5 show the entire range of graduation and the angular disposition of the exhaust ports.

The operation is as follows: In running position, reservoir air is feeding by the pressure-retaining valve to the train pipe, and is also maintaining train pipe pressure in the chamber below the emergency piston. When an emergency application of the brakes is called for, the engineer will turn his handle to the corresponding position, thereby cutting off reservoir communication to the lower piston chamber and putting said chamber to atmospheric exhaust, thus causing the depression of the piston and emergency valve and the consequent full and sudden exhaust of air from the train pipe. Turning the handle to release position, first recharges the lower piston chamber from the reservoir, thus closing the emergency valve, if the same has not been closed by its spring, and then puts the train pipe to full communication with the main reservoir, after which the handle may be turned to running position. When it is desired to effect a measured or certain graduation application of the brakes, the engineer will turn his handle to that one of the graduation positions that represents the required train pipe reduction, the graduation positions on the dial under the handle being each marked to represent the reduction that will be effected at that position—as by numerals indicating pounds of train pipe reduction, or pressure, or pounds or tons pressure exerted by the brakes. Upon the handle being so placed, the graduation passage in the main valve opens the train pipe to the spring cylinder, and train pipe pressure is exerted on the spring piston to move the same to a position (Fig. 4) where it will uncover the graduation exhaust port put to atmosphere by such setting of the handle, and thereby allow train pipe air to escape. When the predetermined reduction has been effected, the spring will return its piston, cover the open exhaust port, and stop the flow of train pipe air. If a greater or added reduction be desired, the handle can be turned to position of greater exhaust; or if the reduction determined upon prove, during exhaust, to be too much, then the handle can be turned backwardly and such exhaust be stopped or be limited by that of the backward, lesser pressure position.

In Fig. 11 I show another form of valve mechanism for opening and closing the final graduation exhaust ports. In this view the parts are like those of the preceding figures, except that a piston valve 38 is provided which valve is lengthwise movable in barrel 39 to open the exhaust ports 31 to the outer or exhaust ports 40, the valve passage 41 effecting such communication for any one port and the main body of the valve closing the other ports. On the barrel of this valve is mounted a spring indicator 42 which engages the indication notches 43 on the scale 44, when the valve is set to a particular position. This valve can, at any time before application of the brakes, be set by hand and left in exhaust position, which is an advantage over the mechanism previously described, in that false manipulation of the main valve will not interfere with the graduation action for which the graduation valve is set; also the particular graduation power indicated can be used repeatedly and without further attention to or manipulation of the graduation mechanism and, further, if for any reason it be desired, the outer exhaust port can be governed independently of the main valve controlling admission of air to such port.

The essential features are, that the predetermined reduction is certainly and accurately effected, and it is not necessary to employ a gage to follow or indicate the reduction of pressure; that an over estimated amount of reduction can be corrected during the reduction flow; that an under estimated reduction can be augmented, but only by definite and certain addition; and that the whole amount of graduation reduction can be so defined that graduation action will not merge into or produce emergency action.

What is claimed as new is—

1. In combination with a train pipe and an exhaust passage therefrom, mechanism adjustable to put said passage at different points along the same to communication with an exhaust port, and an elastically supported abutment movable under train pipe pressure to open said passage to the said port, for the purpose set forth.

2. In combination with a train pipe, an exhaust passage therefrom having an outer exhaust port, an elastically supported abutment located in said passage and moving under train pipe pressure to put said passage and port into open communication, and a valve acting independently of said abutment to control said port, for the purpose set forth.

3. In combination with a train pipe, an abutment adapted to receive train pipe pressure, a plurality of exhaust ports from the train pipe controlled by said abutment, means whereby relative movement is effected by train pipe-pressure as between said abutment and said ports, and a port closing mechanism for opening one of said ports and closing the others, for the purpose set forth.

4. In combination with a train pipe exhaust passage, an elastically supported abutment or piston, two or more exhaust ports from the train pipe relative to which said abutment has movement under train pipe pressure to open the train pipe thereto, and a valve mechanism movable to open any one of said ports and to close the others, substantially as set forth.

5. In combination with a train pipe and an exhaust passage therefrom adapted to be opened and closed as by a hand valve, an abutment in said passage, and a plurality of exhaust ports therefrom controlled by said abutment and by relative movement between the ports and abutment, and means such as a hand valve for opening one of said ports to exhaust the train pipe and for closing the others, substantially as set forth.

6. In combination with an engineer's valve mechanism, a train pipe exhaust passage connection to and opened and closed by the hand operated part of said mechanism, a spring sustained piston in said passage movable over and to connect a series of exhaust ports with the passage, said ports being also controlled by said hand operated part, substantially as set forth.

EDWARD G. SHORTT.

Witnesses:
JOHN UNSER,
H. B. EDMONDS.